(12) United States Patent
Bitetto

(10) Patent No.: US 8,256,900 B2
(45) Date of Patent: Sep. 4, 2012

(54) METHOD AND APPARATUS FOR PROJECTING IMAGE PATTERNS AND COLORS FOR PLANNING AN INTERIOR IMPROVEMENT PROJECT

(76) Inventor: James J. Bitetto, Dix Hills, NY (US)

( * ) Notice: Subject to any disclaimer, the term of this patent is extended or adjusted under 35 U.S.C. 154(b) by 1129 days.

(21) Appl. No.: 11/398,309

(22) Filed: Apr. 5, 2006

(65) Prior Publication Data
US 2007/0236671 A1    Oct. 11, 2007

(51) Int. Cl.
G03B 21/26    (2006.01)

(52) U.S. Cl. ............................ 353/28; 382/162; 382/167

(58) Field of Classification Search .................. 353/122, 353/85, 84, 62, 43, 11, 28, 33
See application file for complete search history.

(56) References Cited

U.S. PATENT DOCUMENTS

| | | | |
|---|---|---|---|
| 1,908,203 A * | 5/1933 | Wilfred ............................ 472/61 |
| 5,592,294 A | 1/1997 | Ota et al. |
| 6,196,687 B1 * | 3/2001 | Smith ............................. 353/31 |
| 6,412,956 B2 * | 7/2002 | Fujita et al. .................. 353/122 |
| 6,961,461 B2 | 11/2005 | MacKinnon et al. |
| 6,985,163 B2 | 1/2006 | Riddle et al. |
| 7,021,772 B2 * | 4/2006 | Abe et al. ....................... 353/97 |
| 7,111,946 B2 * | 9/2006 | Abe et al. ....................... 353/97 |
| 7,111,947 B2 * | 9/2006 | Abe et al. ....................... 353/97 |
| 7,114,815 B2 * | 10/2006 | Abe et al. ....................... 353/97 |
| 7,128,420 B2 * | 10/2006 | Kapellner et al. ............. 353/38 |
| 7,163,298 B2 * | 1/2007 | Abe et al. ....................... 353/97 |
| 7,377,657 B2 * | 5/2008 | Morejon et al. ................ 353/85 |
| 7,396,133 B2 * | 7/2008 | Burnett et al. .................. 353/69 |
| 2003/0152376 A1 * | 8/2003 | Maeda et al. ..................... 396/2 |
| 2004/0140982 A1 * | 7/2004 | Pate ............................... 345/600 |
| 2004/0239880 A1 * | 12/2004 | Kapellner et al. ............. 353/20 |
| 2005/0206859 A1 * | 9/2005 | Miyasaka ..................... 353/122 |
| 2006/0018535 A1 * | 1/2006 | Oon et al. ..................... 382/167 |
| 2006/0119800 A1 * | 6/2006 | Burnett et al. .................. 353/69 |

* cited by examiner

Primary Examiner — Francis M Legasse, Jr.
Assistant Examiner — Bao-Luan Le
(74) Attorney, Agent, or Firm — James J. Bitetto, Esq.

(57) ABSTRACT

A system and method for projecting an image with predetermined characteristics includes a projector configured to project light on a surface, and a photo sensor configured to analyze light reflected from the surface. A controller is configured to compare the reflected light with a selected characteristic. The controller is configured to control the projector to adjust the projected light such that the reflected light substantially matches the selected characteristic to make the surface appear to be of the selected characteristic.

25 Claims, 3 Drawing Sheets

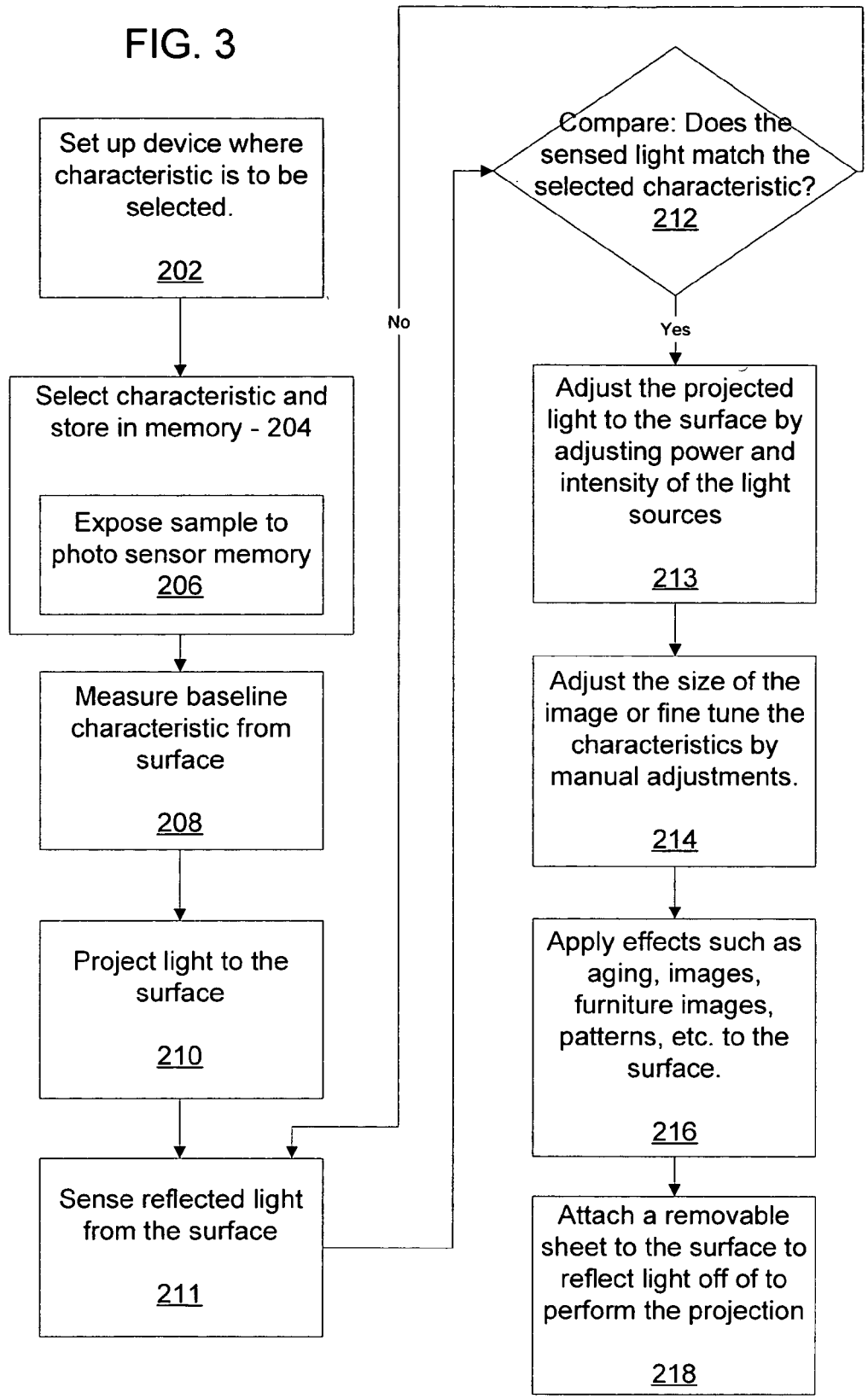

METHOD AND APPARATUS FOR PROJECTING IMAGE PATTERNS AND COLORS FOR PLANNING AN INTERIOR IMPROVEMENT PROJECT

BACKGROUND

1. Technical Field

The present invention relates to project planning, and more particularly to a projection system with feedback to demonstrate a pattern or color scheme on a surface to be modified.

2. Description of the Related Art

Construction projects often require an individual to imagine how a room, wall or surface would like after the renovation or project is completed. This is particularly difficult in renovations where existing furniture, carpeting or other features in a room will remain and new colors or features will be introduced.

In some instances, rooms may be modeled using computer software programs to attempt to provide an idea of how the finished project will look. Computer programs are helpful in this regard but do not provide an actual look of the room as is. This is particularly true when the colors of the room and its features are to be selected.

In the case of paint, manufacturers provide small swatches or colored chits for a home owner to bring home and compare with the color scheme in their home. These swatches and chits are often inadequate for an individual to picture the final appearance of a room.

In other instances, small samples of paint are given to the individual to paint a portion of a wall or surface to determine the appearance of the completed project. While helpful, this scheme includes many drawbacks. For example, if the color is not selected the wall has been painted and needs to be refinished. In addition, not enough of the surface may be prepared to give an overall impression of the finished project.

Therefore, a need exists for a system and method for demonstrating a color, pattern or texture to a surface in a way that does not alter the surface and provides a sufficient enough area to imagine features of a completed project.

SUMMARY

A system and method for projecting an image with predetermined characteristics includes a projector configured to project light on a surface, and a photo sensor configured to analyze light reflected from the surface. A controller is configured to compare the reflected light with a selected characteristic. The controller is configured to control the projector to adjust the projected light such that the reflected light substantially matches the selected characteristic to make the surface appear to be of the selected characteristic.

A system for projecting an image with predetermined color includes a projector configured to project light on a surface, and a photo sensor configured to receive light reflected from the surface. A controller is configured to analyze the reflected light and compare the reflected light with a selected color. The controller is configured to control the projector to adjust the projected light by adjusting color component intensity and wattage for light projected from the projector such that the reflected light substantially matches the selected color to make the surface appear to be of the selected color.

A method for adjusting an appearance of a surface includes projecting light on a surface, sensing reflected light from the surface, comparing the reflected light with a selected characteristic, and adjusting the light projected on the surface by adjusting at least one of color component intensity and wattage for light projected from the projector such that the reflected light substantially matches the selected characteristic to make the surface appear to be of the selected characteristic.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a flow diagram showing a method for employing the methodology in accordance with an embodiment of the present invention.

DETAILED DESCRIPTION OF PREFERRED EMBODIMENTS

Figure 1:
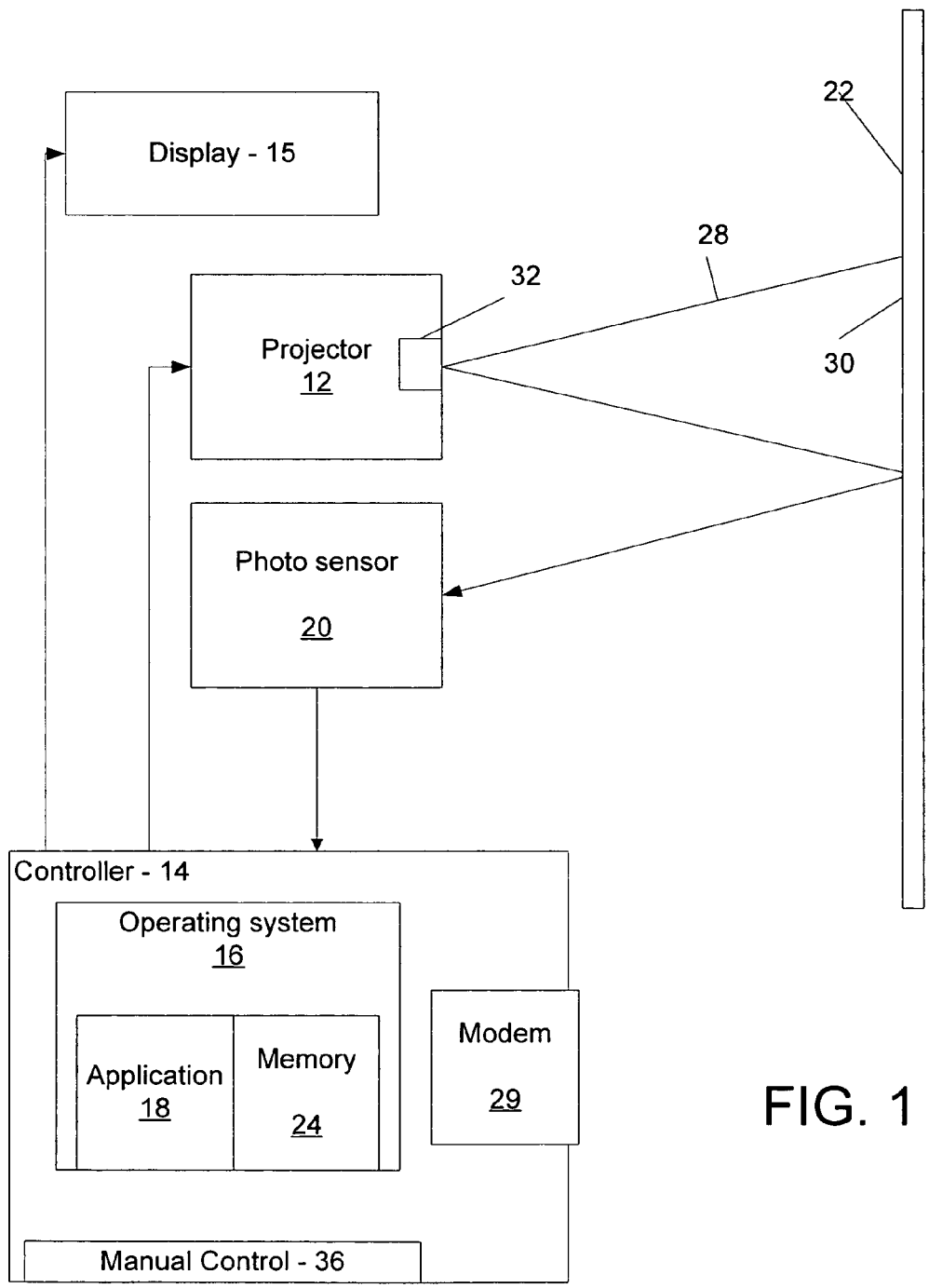
FIG. 1 is a block diagram illustratively showing a system in accordance with one embodiment.

Embodiments of the present invention are directed to a system and method for determining and adjusting a projected color, pattern or texture on a surface. In particularly useful embodiments, the system and method may be employed as a technique for displaying by projection a color, texture or pattern on a wall, ceiling, floor, of an interior (or exterior) space to aid in selecting a color, pattern or texture to be employed in a renovation project or to decorate that surface or area.

In one embodiment, the system includes a color projector which employs a color controller, which may be a software application run on a computer or computer device. A color may be selected by a user and projected on a surface, such as a wall. However, due to the existing color of the wall, the projected color needs to be adjusted such that the reflected color is the same as the selected color. This may be performed using a spectrum analyzer which determines the reflected color and determines what colors need to be adjusted in the projected light to create a reflected color that matches the selected color. Analysis of the light and the generation of the projected light may be performed in a plurality of known ways. One technique may include that described in U.S. Pat. No. 6,985,163, incorporated herein by reference. Other applications and variations for the present embodiments are contemplated as well.

Embodiments of the present invention can take the form of an entirely hardware embodiment, an entirely software embodiment or an embodiment including both hardware and software elements. In a preferred embodiment, aspects of the present invention are implemented in software, which includes but is not limited to firmware, resident software, microcode, etc. Other aspects of the present invention include hardware such as photo sensors, light projectors, etc.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any blocks shown in the figures are conceptual only. Their function may be carried out through the operation of program logic, through dedicated logic, through the interaction of program control and dedicated logic, with hardware or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system 10 for projecting and adjusting a color on a surface 22 is illustratively shown. System 10 includes a plurality of components that may be configured in a single portable unit or the components may be combined from separate devices. System 10 includes a projector 12. Projector 12 may include a color projector that has the ability to project a color or image. In one embodiment, a projector may be of the type connectable to a computer as used for presentations on a screen. The projector 12 may include inputs from a computer or controller 14 that provide pixel information for projection on a screen.

A controller 14 may include a computer, and includes an operating system 16 for implementing and running an application 18. Application 18 may include a method for deciphering light from a photosensor 20, and adjusting light projected by projector 12 to adjust the reflected light from a surface 22. Controller 14 may include a connection to an external network such as the Internet, and provide access to manufacturer's websites or other websites to permit a user access to color sets or patterns provided commercially. This may be helpful in the color selection process. Controller 14 may be connectable to a modem or include a modem 29 therein to connect to a telephone jack, cable port, wireless transmitter/receiver etc.

In a particularly useful embodiment, a user desires to paint or color surface 22, e.g., a wall, ceiling, floor, etc., a particular color, e.g., a shade of blue. The user picks out the color or provides a sample of the color to photosensor 20. The color is stored in memory 24 of the controller 14, and may be viewed by a display 15. The display 15 may be a computer display monitor, a television monitor or a custom display configured to work with system 10 to verify a selected color. When the color has been verified by the user, the projector 12 is activated to project the selected color on the surface 22.

The projector 12 is activated to direct light at the surface 22 to illuminate the surface 22. Since the surface 22 may already have a color, say, green, the shade of blue desired will not be readily reflected from the surface 22.

The light reflected from the surface 22 is detected by photosensor 20 and analyzed (e.g., by performing a spectrum analysis) to determine the constituent color component (e.g., Red, Green and Blue or Yellow, Magenta and Cyan, or any other primary color designations) reflected from the surface 22. A spectrum analysis may include deciphering luminance and reflectance characteristics as is known in the art.

When the light has been analyzed, an adjustment signal is provided to the projector 12 to account for the existing color of the surface 22 or other environment conditions. The projector 12 projects the modified colors to attempt to converge on the originally selected color. This may be an iterative process and the photosensor 20 again analyzes the reflected light to adjust the reflected light from the projector 12 until the light reflected matches or substantially matches the color selected and stored in memory.

The color may be selected by a user on display 15 or scanned into photosensor 20. In this way, an interior design can have stored a plurality of different colors available from paint manufacturers ready for viewing. In an alternate embodiment, these colors may be displayed by projecting a color on a white or light colored sheet. By employing the present system, the color will be automatically corrected to ensure that the color is within an acceptable range.

Advantageously, in accordance with yet another embodiment, the projector 12 working with controller 14 and photosensor 20 can be used to simulate predetermined effects. For example, color fading may be simulated by showing user what the surface color would appear as over time. Other effects may include simulating two or more colors on a same surface, patterns of colors, textures, e.g., wall tiles or mosaic patterns can be projected on a wall to give a user an idea of what a completed project would look like. Other effects may include faux windows, doors, frescos or other artwork. The colors and tones of such effects could be changed and configured in accordance with user preferences.

Projector 12 includes the capability to adjust the color components of the projected light. In addition, amplitude (power/wattage) of the incident radiation (light) on the wall may also be adjustable. In the event, that the light reflected from surface 22 does not converge with the desired color, the projector intensity may be adjusted by changing red, green or blue color components of the pixel sources used to project the color on the surface 22. The projector 12 may include a plurality of narrow wavelength light sources which can be regulated to project different colors. Light diffusers and filters may also be employed to create better mixing of the light components directed at the surface 22.

The projector 12 may include other variable light sources (for example, backlights or other sources in a display device, e.g., a liquid crystal display device), where the intensity of a given color components may be individually controlled (e.g., by pixels) and the output power of that source may be controlled by the back light, for example. Computer controlled projectors, which are known in the art may also be employed.

The projector 12 preferably includes the ability to separately adjust red, blue and green components to be able to simulate the correct reflected light. By altering the intensity on given color components, the illusion of the appropriate color being reflected from surface 22 is provided. For example, if a wall is red and a blue wall is desired the intensity of the blue component may be increased to wash out the red background. Since the intensity increase will increase the amount of reflected light a better approximation of the blue wall will be achieved.

In addition, the power to, say, the red source may be desired to increase the amount of incident radiation on the surface, hence increasing an amount of reflected light. This may be employed to help tilt the balance of absorbed and reflected radiation to create the appearance of a different color. The photosensor 20 would then pick up a larger amount of a given color component to converge or move closer to convergence with the desired color.

Figure 2:
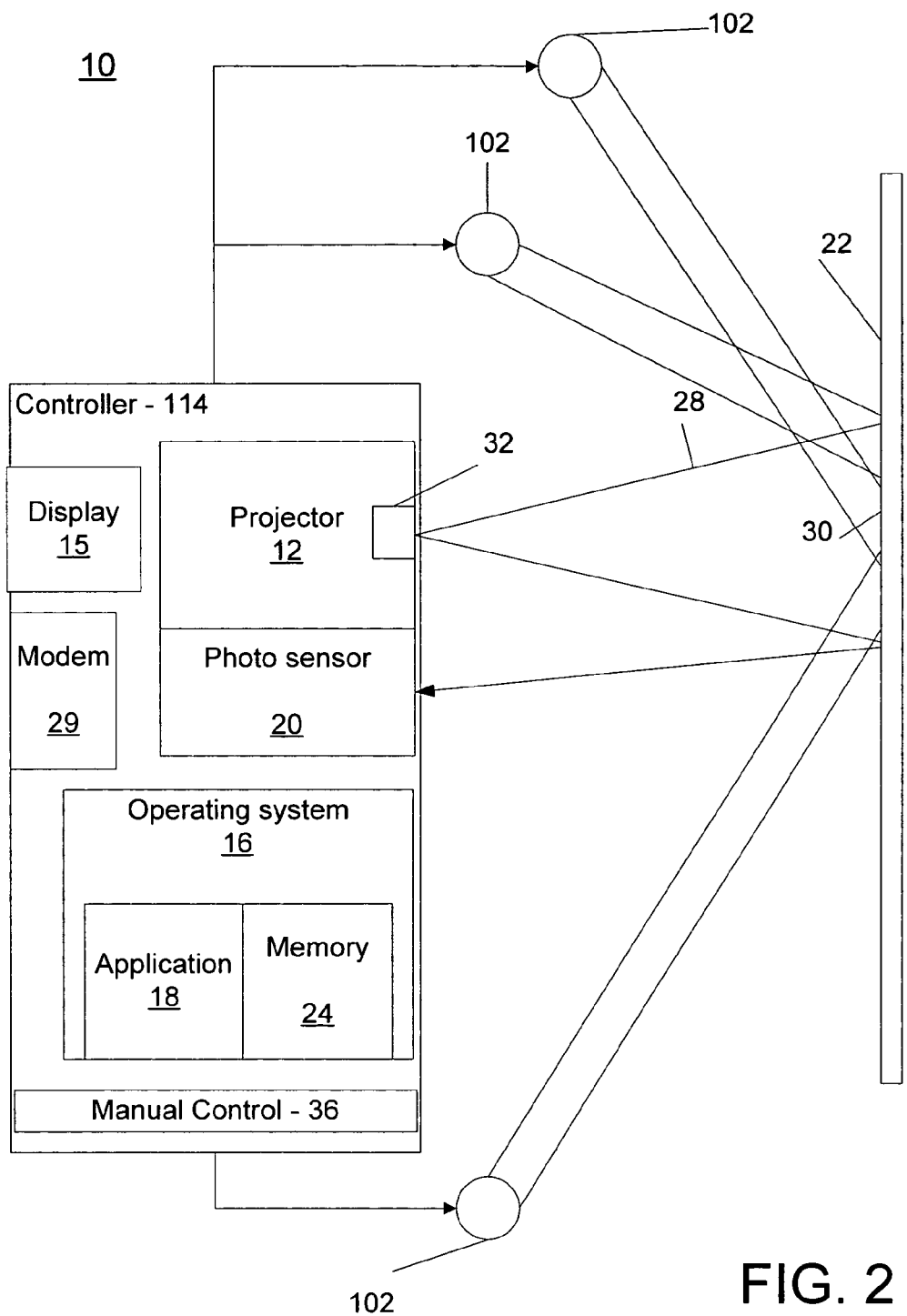
FIG. 2 is a block diagram illustratively showing another system using externally controlled lights in accordance with another embodiment.

Referring to FIG. 2, a controller 114 is illustratively shown as a single unit. Controller 114 includes all the features as described with respect to system 10 in FIG. 1 and controller 14, but may advantageously be employed in a single portable unit in a single housing.

In difficult situations, it may be necessary to precondition the light reflected by surface 22 by employing separate lights 102 which illuminate a predetermined wavelength or wavelengths of light. These lights 102 may create a reflected light effect that when combined with the controlled light of projector better approximate the desired reflected light color. Lights 102 may radiate different wavelengths of lights or may be controlled to provide a predetermined wavelength of light. For example, a manually switched color screen or filter may be employed on lights 102.

Each component of light projected on the surface 22 may be displayed using a combination of three different color signals: red, green and blue. The overall color of the surface 22 is controlled by the intensity of the three components of light and/or the amount of energy the light source is given and the color of the surface 22 from which light is to be reflected. Lights 102 are also advantageously controlled by controller 114 to provide additional light reflecting capabilities.

In an alternate embodiment, lights 120 may be employed with a controller 14 and photosensor 20 and without the projector 12 to adjust the reflected light from a surface.

Referring to FIGS. 1 and 2, by applying, the controlled projected light 28 using feedback from a photosensor 20, an area of color 30 is provided on the surface 22 which matches or nearly matches a selected color, pattern, texture or custom image that the user has made previously. In this way, the user may get a better idea of how the color, pattern, etc. would appear in a room or on a surface for decorating the room without permanently affecting the surface 22. In addition, aging effects, lighting effects and textures can be tested by projection without inconvenience or damage.

Light from projector 12 may be applied in a square, rectangle, circle or any other shape. In one embodiment, the projected light 28 may be selectively shaped by changing a lens 32, lens setting or aperture or filter on the projector 12. Adjustments to the shape, size, color or other characteristics may be set in software as defaults or changed by a user. In addition, manual controls 36 may include to permitting adjustments.

While embodiments have been presented for interior decorating decisions, the color adjustment system may have a plurality of other uses. For example, in one embodiment, hair color may be virtually altered by applying the light from projector 12 and adjusting the light to achieve a selected hair color. This embodiment may have applications in hair salons or the like for projecting a hair color, although being able to provide a product to dye the hair to match the projected color may be difficult since hair texture and products differ in effectiveness.

Referring to FIG. 3, a block diagram shows a method for selectively projecting a color onto a surface in accordance with an illustrative embodiment. In block 202, a system 10 may be set up in a residence or business where a color, pattern or texture needs to be selected from the interior surfaces. In block 204, an interior designer or user selects a characteristic, e.g., color, pattern, texture, etc. to be applied to the walls, ceiling, floor furniture or any other surface. The characteristic is stored in memory. For example, the color to be selected may be determined based on a color sample exposed to the photo sensor (to input the color into memory), or as an image generated on a computer screen (e.g., display 15). The color selected may be a color corresponding to a manufacturer's product or may be a color that can be mixed. Other selections may include wall papers patterns, textured surfaces, tile patterns, etc. Such selections may be made available on the controlled 14 or 114 for the user to select from. In block 206, if a color sample is used the photosensor may be exposed to the color sample to digitally store the sample in the controller. The sample color will be the color to be achieved on the wall or surface.

In block 208, a baseline measurement of a surface is performed. In one embodiment, the wall or surface is illuminated with white light or colored light so that a color assessment of the surface can be performed by the photo sensor. This reflected light will assist in determining initial setting for converging on the user-selected color. Also background lighting may be accounted for. For example, put in simplistic terms: if the desired color includes 200 red, 300 green and 100 blue and the reflected color with ambient conditions provides a contribution of 0 red, 500 green and 100 blue, the initial projected color may need to be 200 red, −300 green and 0 blue. Since the green components cannot be negative, the red, green and blue components have to be adjusted to provide the appearance of the user-selected color. This is performed by an iterative adjustment of the color combination and the increase or decrease of incident radiation of the color components on the surface using feedback form the photo sensor.

In block 210, after the baseline measurement is made, the projector (12) and/or lights (102) are activated to provide incident light to the surface. In block 211, the photo sensor (20) measures or senses the light reflected back and compares the color of this light to the user-selected color in block 212. In block 213, the controller makes adjustments to the lights (102) and/or the projector (12) to attempt to converge on the user-selected color. This may be performed by iteratively changing the color combinations and changing the intensity of the incident light. The color can be changed using the abilities of controller (14 or 114) to adjust the wavelengths of the projected light. In addition, the power of the lights and or projector may be changed to enable a larger amount of light from a single color component or components. This can also be performed iteratively by increasing/decreasing power to the lights of projector or other lights or moving the projector further from or closer to the surface, adjusting the aperture and lens, etc. The adjustments may be performed on a single light component or on multiple light components until the light is substantially the same as the selected color. Substantially the same color may include the actual color or a color that appears close to the selected color. Iterations may continue until the user-selected color is converged upon.

In block 214, the projected image size may be adjusted in accordance with user preferences by adjusting the lens, filters, etc. Manual adjustments to the lights sources may also be permitted to fine tune the color, if desired. In block 216, different effects may be employed using the controller and applications stored thereon. For example, aging effects, wall paper patterns, tile patterns, picture frame with pictures and other visual effects may be applied to the color background or incorporated therein. Aging effects may be employed using a program to fade the colors due to exposure to oxygen, sunlight etc. Wall paper patterns, mosaics and other textures and patterns can be stored in the memory and projected on the surface. Pictures or images may be projection from digitally photographed objects stored in the controllers and displayed by the projector. These effects may be performed by the same projector or a different projector may also be employed. Other effects may include projecting images of furniture, plants, fireplaces, borders, moldings or other interior decorations.

In block 218, in the event that difficulties are encountered in achieving the desired/selected color on the surface measure may be taken to prepare the surface to permit a non-damaging projection of he desired color, pattern, etc. One such measure may include applying a white or light colored surface on the surface where the projection is to be located. For example, a light colored fabric or sheet of material may be adhered to the surface and the projected light may be directed at the light colored fabric or material to create the appropriate color reflection therefrom.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for planning a renovation project, comprising:
a projector configured to project light on a surface to permit visualization of a renovation project result;
a photosensor configured to receive light reflected from the surface;
a scanner configured to input a user-selected paint or wallpaper color associated with the renovation project result to be rendered on the surface;
a controller configured to analyze spectral properties of the reflected light due to a color of the surface and compare the spectral properties with the user-selected color input from the color selection device, the controller configured to control the projector to adjust the projected light such that the spectral properties of the reflected light substantially match the user-selected color to make the surface appear to be of the user-selected color, wherein the projected light accounts for a color of the surface and provides the renovation project result; and
an effect simulator configured to produce a predetermined visual effect on the surface, the effect simulator at least being configured to simulate an aging effect on the user-selected color by fading out the user-selected color on the surface to indicate how the surface color would appear over a period of time.

2. The system as recited in claim 1, wherein the user-selected color includes at least one of a pattern and texture.

3. The system as recited in claim 1, further comprising a decorative image projected over a projection of the user-selected color.

4. The system as recited in claim 1, the system further comprises one or more lights controlled by the controller and projecting a single component of light to adjust the color of light reflected from the surface.

5. The system as recited in claim 1, wherein the controller adjusts color component intensity and adjusts incident energy for color components on the surface.

6. The system as recited in claim 1, wherein the user-selected color is input to the controller by scanning the color with the photo sensor.

7. The system as recited in claim 1, wherein the controller employs a display, such that the user-selected color is selected from a color stored in memory of the controller and displayed on the display.

8. The system as recited in claim 1, wherein the projector includes at least one light source including adjustable color components and adjustable wattage.

9. The system of claim 1, further comprising at least one external light source configured to precondition the light reflected from the surface by illuminating the surface with preconditioning light having a predetermined wavelength, the at least one external light source being external to the projector.

10. The system of claim 1, wherein the user-selected color is selected via an external network which provides a user with access to commercially available color sets or patterns.

11. The system as recited in claim 3, wherein the decorative image includes at least one of an image of a picture, a tile pattern, a wall paper pattern, an image of furniture, and an image of an interior decoration.

12. The system of claim 9, wherein the controller collectively controls the at least one external light source in conjunction with the projector to combine the preconditioning light with the light from the projector in a manner which converges upon the user-selected color.

13. A system for planning a renovation project, comprising:
a projector configured to project light on a surface to permit visualization of a renovation project result;
a photo sensor configured to receive light reflected from the surface;
a scanner configured to input a user-selected paint or wallpaper color associated with the renovation project result to be rendered on the surface;
a controller configured to analyze the spectral properties of the reflected light due to a color of the surface and compare the reflected light with the user-selected color input from the color selection device, the controller configured to control the projector to adjust the projected light by adjusting color component intensity and wattage for light projected from the projector such that the spectral properties of the reflected light substantially match the user-selected color to make the surface appear to be of the user-selected color, wherein the projected light accounts for a color of the surface and provides the renovation project result; and
an effect simulator configured to produce a predetermined visual effect on the surface, the effect simulator at least being configured to simulate an aging effect on the user-selected color by fading out the user-selected color on the surface to indicate how the surface color would appear over a period of time.

14. A method for planning a renovation project, comprising:
scanning a user-selected paint or wallpaper color associated with a renovation project result to be rendered on a surface to permit visualization of the improvement project result; and
projecting light on the surface;
sensing reflected light from the surface;
analyzing spectral properties of the reflected light due to a color of the surface;
comparing the spectral properties of the reflected light with the user-selected color; and
adjusting the light projected on the surface by adjusting at least one of color component intensity and wattage for light projected from the projector such that the spectral properties of the reflected light substantially match the user-selected color to make the surface appear to be of the user-selected color, wherein the light projected accounts for a color of the surface and displays the renovation project result; and
simulating an aging effect on the surface on the user-selected color by fading out the user-selected color on the surface to indicate an appearance of the surface over a period of time.

15. The method as recited in claim 14, wherein the user-selected color includes at least one of a pattern and texture.

16. The method as recited in claim 14, further comprising projecting a decorative image over a projection of the user-selected color.

17. The method as recited in claim 14, wherein adjusting includes controlling one or more lights to project a single component of light for adjusting the reflected light from the surface.

18. The system as recited in claim 14, wherein adjusting includes adjusting one of color component intensity and incident energy for color components on the surface.

19. The method as recited in claim 14, wherein inputting a user-selected color involves scanning a color with the photo sensor.

20. The method as recited in claim 14, wherein inputting a user-selected color involves selecting a color stored in memory and displayed on a display.

21. The method as recited in claim 14, wherein the projector includes at least one light source and the method includes adjusting color components and wattage of the at least one light source.

22. The method as recited in claim 14, further comprising attaching a light colored sheet to the surface, projecting light on the sheet and sensing light reflected from the sheet to compare with the user-selected color.

23. A computer program product comprising a computer useable medium including a computer readable program, wherein the computer readable program when executed on a computer causes the computer to perform the steps of claim 14.

24. The method of claim 14, further comprising selecting a paint color to implement the renovation project based on the visualization of the renovation project result.

25. The method as recited in claim 16, wherein the decorative image includes at least one of an image of a picture, a tile pattern, a wall paper pattern, an image of furniture, and an image of an interior decoration.

* * * * *